United States Patent [19]

Miwa et al.

[11] Patent Number: 4,575,799
[45] Date of Patent: Mar. 11, 1986

[54] ULTRASONIC LIVING BODY TISSUE CHARACTERIZATION SYSTEM

[75] Inventors: Hirohide Miwa, Kawasaki, Japan; John M. Reid, St. Davids, Pa.

[73] Assignee: Fujitsu Limited, Kawasaki, Japan

[21] Appl. No.: 477,935

[22] Filed: Mar. 23, 1983

[51] Int. Cl.$^4$ .............. G01N 29/04; G01S 15/89; G01S 7/52; A61B 10/00
[52] U.S. Cl. .................... 364/414; 73/599; 73/602; 128/660
[58] Field of Search ............ 73/599, 602, 614, 620, 73/624, 625, 627, 629; 128/660; 364/414

[56] References Cited

U.S. PATENT DOCUMENTS

| 4,176,658 | 12/1979 | Kossoft et al. | 73/602 X |
| 4,409,838 | 10/1983 | Schomberg | 73/602 |
| 4,414,850 | 11/1983 | Miwa et al. | 73/599 |
| 4,441,368 | 4/1984 | Flox | 73/599 |
| 4,452,082 | 6/1984 | Miwa | 73/599 |
| 4,475,396 | 10/1984 | Flox et al. | 73/599 |
| 4,475,397 | 10/1984 | Riley et al. | 73/599 |

Primary Examiner—Jerry Smith
Assistant Examiner—Clark A. Jablon
Attorney, Agent, or Firm—Staas & Halsey

[57] ABSTRACT

A method for ultrasonic living body tissue characterization using a transducer and processor. The method includes the steps of transmitting an ultrasonic pulse into the tissue and receiving a reflected pulse, calculating the normalized power frequency spectrum of the reflected pulse, determining the frequency at which the maximum value for the power spectrum occurs, determining the high and low half power frequencies, calculating the upper and lower frequency ratios of the maximum value frequency and the half power frequencies, and determining the power exponent of the frequency of the reflection coefficient. The frequency exponent of the reflection coefficient is used to calculate the attenuation slope of the ultrasonic wave. The attenuation slope or the reflection power exponent is used to generate a tomographic image of the living tissue characteristics for visual non-invasive tissue diagnosis. The attenuation slope and/or the reflection power exponent tomographic image or the others can be combined with a reflection intensity tomographic image or the others to produce other diagnostic images.

21 Claims, 17 Drawing Figures

ULTRASONIC LIVING BODY TISSUE CHARACTERIZATION SYSTEM

BACKGROUND OF THE INVENTION

This invention relates to a system for measuring the values of living body tissue characteristics n and $\beta$ which uses a reflected ultrasonic wave, where $\beta$ is a proportionality constant called the attenuation slope describing the tissue attenuation constant being proportional to $\beta f$ (f is the frequency of the ultrasonic wave) and where n is a power exponent constant called the reflection power exponent describing the tissue reflection coefficient being proportional to the frequency of the ultrasonic wave raised to the power n, and more particularly, to a method for separately obtaining n and $\beta$ from the shape of the power spectrum of the reflected ultrasonic wave.

Two previous methods, different from the method used by the present invention, for obtaining the proportionality constant $\beta$ (that is, the attenuation slope) have been proposed by Dr. Miwa et al. in the following applications:

1. An energy ratio method where the value of $\beta$ is obtained from the energy ratio of two frequency bands. This method is disclosed in Japanese patent application No. 55-74680, filed June 3, 1980 having corresponding U.S. patent application Ser. No. 269,861, filed June 3, 1981, now U.S. Pat. No. 4,414,850, the contents of which are hereby incorporated by reference.

2. A center frequency shift method where a value of $\beta$ is obtained from the shift in the center frequency of a power spectrum of a Gaussian distribution ultrasonic pulse as it passes through tissue. This method is disclosed in Japanese patent application No. 56-65536, filed Apr. 30, 1981 having corresponding U.S. patent application Ser. No. 372,547, now U.S. Pat. No. 4,452,082, filed Apr. 28, 1982 the contents of which are hereby incorporated by reference.

The above-mentioned methods are based on the assumption that the reflected coefficient does not depend on frequency. Actual experimental evidence proves that the reflected coefficient is proportional to the frequency raised to the power n, where n is a constant within the range from 0 to 6 depending on the specific tissue type and indicates a particular characteristic of the tissue. Thus, because of the above-mentioned assumptions related to the reflection coefficient, the above-mentioned methods result in considerable error.

Another method different from the method of the present invention for obtaining the values of $\beta$ and n by analyzing reflected ultrasonic waves where the values $\beta$ and n are combined has been proposed by Dr. Miwa et al. in a method which utilizes three frequencies. This method is an extension of the energy ratio method mentioned above and is disclosed in Japanese patent application 57-57573 (also EP No. 91768, published Oct. 19, 1983), filed Apr. 7, 1982 the contents of which are hereby incorporated by reference. This method is effective for analyzing living body tissue but has a drawback in that errors due to local fluctuation of the spectrum can be introduced. The local fluctuation of the spectrum results from the mutual interference of overlapped pulse echoes, which is known as scalloping and is due to the narrow frequency bands used in the three frequency method. This method has a further disadvantage in that a large number of calculations are necessary because of the various combinations of the three frequencies within the effective frequency band that must be performed to provide an ensemble of n and $\beta$ values for statistical processing. The present invention utilizes the entire pulse spectrum and is called a spectrum shape method.

SUMMARY OF THE INVENTION

It is an object of the present invention to provide a system for separately determining n and then $\beta$ by analyzing the shape of the power frequency spectrum.

It is another object of the present invention to provide an easy method for calculating n and $\beta$.

It is a further object of the present invention to provide rapid calculation of $\beta$ for a plurality of points along a scan line in the living tissue, so that a tomographic image of the tissue can be rapidly produced by shifting the scan line in the tomographic plane.

It is still another object of the present invention to produce n and $\beta$ free from errors due to scalloping.

It is moreover an object of the present invention to combine a $\beta$ and/or n tomographic image with a reflection intensity tomographic image or others to produce enhanced diagnostic images.

It is furthermore an object of the present invention to provide an effective non-invasive tissue diagnostic method.

The method of the present invention includes transmitting an ultrasonic pulse and receiving the reflected pulse. The analog reflected pulse is converted into frequency analyzed data and the power frequency spectrum of the reflected pulse is produced using a Fourier Transform method. The power frequency spectrum is normalized and the frequency of the maximum value of the power spectrum curve is obtained. Upper and lower frequencies at which the power spectrum reaches one-half the maximum value (half power points), are also obtained. The half power point frequencies are normalized by the maximum value frequency to determine upper and lower frequency ratios. The upper and lower frequency ratios are then used to calculate n or a table look-up method using the upper and lower frequency ratios as indexes is used to obtain n. The attenuation slope is calculated using n, the maximum value frequency, the sound velocity and the time difference of the echo between two sampling points. A plurality of attenuation coefficients $\beta$ and/or n are obtained to form a tomographic image of the living tissue. The $\beta$ and/or n tomographic image can be combined with a reflection intensity tomographic image or others to produce enhanced diagnostic images.

BRIEF DESCRIPTION OF THE DRAWINGS

FIGS. 3(A)–3(D) are graphs of waveforms during a signal sampling process performed by the system of FIG. 2;

DESCRIPTION OF THE PREFERRED EMBODIMENTS

The method of the present invention determines the characteristic values of a living body tissue transfer function frequency spectrum as a function of n and the normalized frequency only and not as a function n and $\beta$. The present method determines the value of n without using the n and $\beta$ complex by recognizing that the normalized frequency spectrum response at points corresponding to upper and lower frequency ratios can be expressed as a function of n. The upper frequency ratio $y_+$ equals $f_+/f_m$ and the lower frequency ratio $y_-$ equals $f_-/f_m$, where $f_m$ indicates the frequency at which the maximum value of the power frequency spectrum curve occurs, and where $f_+$ and $f_-$ are the frequency values bove and below the frequency $f_m$ where the power frequency spectrum curve falls to one half of the maximum value. $\beta$ can be obtained from the n and $f_m$ obtained above.

Figure 1:
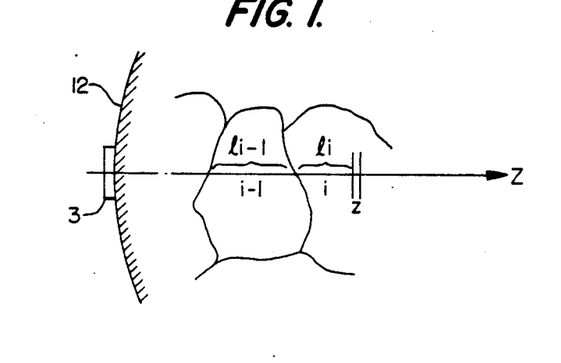
FIG. 1 is a schematic diagram of living body tissue regions and the relative position of a transmitter/receiver 3.

FIG. 1 illustrates how an ultrasonic pulse, having a center frequency $f_0$ and a bandwidth $2\Omega$ is transmitted into a living body 12 in the direction Z by a transducer 3 positioned against a surface of the living body 12. The pulse reaches different tissue regions i at the velocity of sound C, while the reflected waves from each tissue boundary travel in the $-Z$ direction at the velocity of sound C and are received by transducer 3. When the characteristics of the tissue at the depth z are to be measured, the pulse passes through i different tissue regions and the velocity of sound C is assumed to be constant. The sound pressure of the pulse transmitted into the living body 12 is attenuated in accordance with the attenuation constant $\alpha i$ in proportion to the frequency f in each region i. When the proportionality constant is defined as $\beta i$, the attenuation constant $\alpha i$ is expressed as $\alpha i = ai + \beta i \times f$ (where ai is a constant). $\beta i$ is a parameter indicating the specific characteristic of the tissue i and is called the attenuation slope. Each tissue region i has a power reflection coefficient which is proportional to the frequency raised to the power $n_i$, where $n_i$ indicates the specific characteristics of the tissue i and is called the reflection power exponent. When the ultrasonic wave or pulse passes from the tissue region i−1 to the tissue region i, a portion of the ultrasonic wave energy is reflected, resulting in a stepwise transmission loss. The pressure transmission ratio is denoted by $\tau i$ and is substantially frequency independent. In the same manner, the ultrasonic wave reflected at the depth z travels in the $-Z$ direction from the region i to the region i−1, and the transmission ratio in the $-Z$ direction is defined as $\tau i'$. The transmission ratios $\tau i$ and $\tau i'$ can both be considered to have frequency independent characteristics.

Transducer 3, after transmitting the ultrasonic pulse, receives the reflected waves from the different tissue regions as the transmitted ultrasonic wave passes deeper into the tissue. The reflected wave corresponding to the depth z, reaches the transducer after a time $t = 2z/C$ determined from the instant of original pulse transmission. Thus, a tissue characteristic at the depth z can be obtained by analyzing the reflected waveform which arrives at the transducer 3 during a short period of time around the time t.

Living tissue analysis can be performed by looking at sound pressure, power and other parameters, however, the present invention uses the power spectrum. The power spectrum Pr(f) of the wave reflected at the depth z can be obtained with a frequency analyzer or general purpose digital computer using a well-known Fast Fourier Transform (FFT) technique. Such an FFT method for obtaining a power spectrum is disclosed in *Digital Signal Analysis* by Samuel D. Sterns published by Hayden Book Company, Inc. 1975 at pages 249–255 and Appendix A. The power function Pr(f) is the square of the product of the transfer function of the measuring system representing such factors as the transfer function of the transducer, the beam directionality of the sound wave, the transfer function of the amplifier of the measuring system and the transfer function of the living body tissue including the transmission, attenuation and reflection coefficients.

In order to obtain a normalized power spectrum the power spectrum $P_0(f)$ of the measuring systtem must be obtained for the received waveform. The power spectrum $P_0(f)$ of the measuring system is obtained by immersing the transducer 3 in a water bath and receiving a pulse echo from a standard reflector at a distance z from the transducer. The reflected wave is Fourier transformed and the power spectrum $P_0(f)$ is obtained.

The normalized power spectrum R(f) exp, or square of the transfer function of the living body tissue, can be obtained by dividing the power spectrum Pr(f) of the wave reflected from the tissue by the power spectrum $P_0(f)$ of the measuring system. This normalized power frequency spectrum of actually measured data, as denoted by R(f)mes, can be called the experimental or measured spectrum value. From the above description of the frequency response, the theoretical value for the power spectrum R(f) must be expressed by equation 1 as follows:

$$R(f) = k \cdot f^{n(z)} \cdot \left( \frac{z}{\pi} \sum_{i=1}^{z} \tau i \tau i' \right)^2 \cdot \exp\left( -4 \sum_{i=1}^{z} \beta i f l i \right) \quad (1)$$

where k is a constant independent of f and li is the path length of the wave within the region i. The present invention provides a method for obtaining n and $\beta$ by comparing the measured power spectrum R(f)mes with the theoretical power spectrum R(f) of equation 1.

A single transducer cannot obtain a meaningful value for R(f)mes outside of its effective bandwidth. Therefore, it is recommended that a plurality of transducers of different frequency bandwidths be used to obtain R(f)mes for a sufficiently wide frequency range.

During actual measurements, the shape of the frequency spectrum suffers local irregularity due to interference caused by overlapped reflected waves from adjacent reflectors and spectrum scalloping can result, producing errors in measurement. As explained in the preceding applications by Miwa et al., to prevent such error it is necessary to employ statistical data processing techniques such as data averaging temporally and spatially around a tissue portion of interest (that is, around a point z). The average data should be taken from the front, back, right, left, upper and lower portions of the tissue around the point z and R(f)mes can be obtained as explained above.

From equation 1, the frequency, $f_m$ which gives the maximum value for R(f) can be obtained as indicated by the following equation 2.

$$f_m = \frac{n(z)}{4 \sum_{i=1}^{z} \beta_i l_i} \quad (2)$$

When the frequency is normalized in accordance with equation 3, $$y = f/f_m \quad (3)$$

equation 1 can be expressed as follows:

$$R = K(ny)^n \exp(-ny) \quad (4)$$

where $$K = k \left( 4 \sum_{i=1}^{z} \beta_i l_i \right)^{-n} \left( \sum_{i=1}^{z} \tau_i \tau_i' \right)^2$$

When R is replaced with $$S = 1/n \sqrt[n]{R/K} .$$

equation 4 can be expressed as:

$$S = y \cdot e^{-y} \quad (5)$$

and S becomes the maximum $S_{max}$ when y=1, and $S_{max}$ becomes $$S_{max} = e^{-1} \quad (6)$$

Normalizing S with $S_{max}$ results in equation 7.

$$S/S_{max} = y \cdot e^{1-y} \quad (7)$$

Equation 7 is a universal normalized function independent of the K, namely of $\tau$ and $\beta$. The left side is a function of n R(f)/R(f)$_{max}$, and the right side is a function of normalized frequency. Equation 7 is derived in the present invention for the undefined value of n as an extension of the equation proposed by one of the inventors for the specific case where n=4.

The method of the present invention, where n is first determined and then $\beta$ is obtained based on equation 7 is explained hereinafter. Equation 1 describes a curve which has a maximum value of $R_m$ at the frequency $f_m$ and gradually reduces in magnitude on both sides of $f_m$. The half power frequencies on the upper and lower side of $f_m$ for R(f) can be obtained, and the high half power frequency is designated by $f_{30}$ and the low half power frequency is designated by $f_-$. These values are obtained by scanning the value of the power spectrum produced until the upper and lower values which correspond to one half $R_m$ are found. The values of the frequency ratio corresponding to the upper and lower half power frequencies are compared to $R_m$ are denoted as $y_+$ and $y_-$, respectively. S at the half power point ($S_{\frac{1}{2}}$) can be obtained corresponding to $R = \frac{1}{2} \times R_m$ from equation 5 as follows.

$$S_{\frac{1}{2}} = \frac{1}{n} \sqrt[n]{\frac{R_m}{2} \cdot \frac{1}{K}} = 2^{-1/n} \cdot \frac{1}{n} \sqrt[n]{\frac{R_m}{K}} = 2^{-1/n} S_{max} \quad (8)$$

From equations 7 and 8, $S_{\frac{1}{2}}/S_{max}$ at $y_+$ and $y_-$ is given by equation 9.

$$2^{-1/n} = y_+ e^{1-y_+} \text{ and } 2^{-1/n} = y_- e^{1-y_-} \quad (9)$$

From equation 9, since $y_+$ and $y_-$ can be obtained from actual measurements n can also be obtained.

Figure 2:
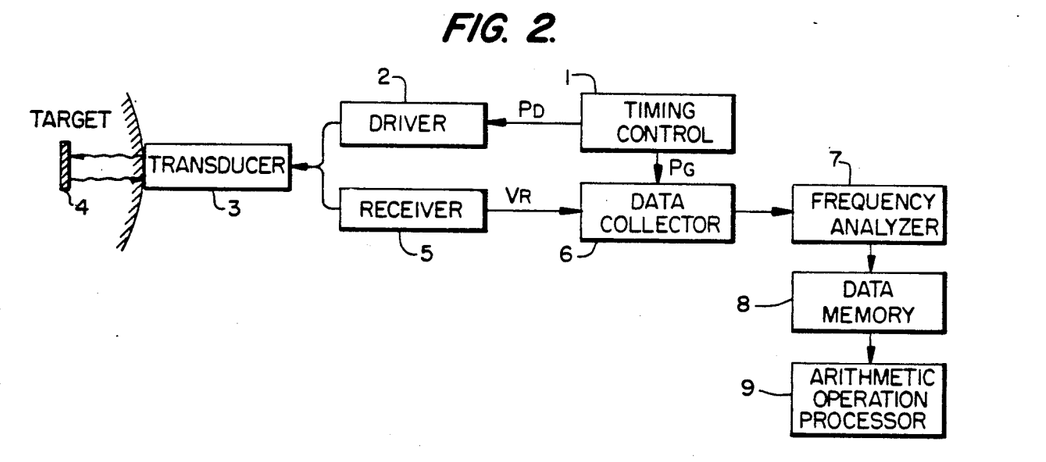
FIG. 2 is a block diagram of an ultrasonic tissue analysis system for performing the method of the present invention.
Figure 3A:
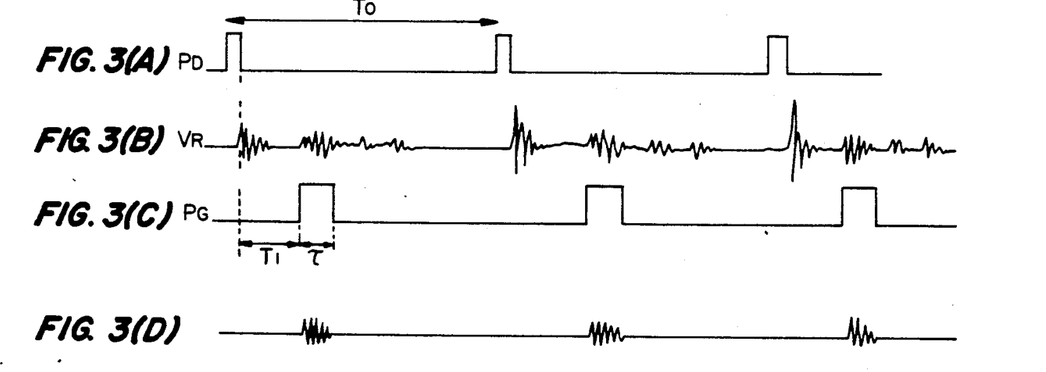

A system for performing the above-mentioned sampling and calculating is illustrated in FIG. 2. The signals transmitted and received by the system are graphically illustrated in FIGS. 3(A)-3(D). A timing clock pulse $P_D$ (shown in FIG. 3(A)) is transmitted to driver circuit 2 from timing controller 1, a piezo-electric transducer 3 is driven by the pulse and an ultrasonic wave is transmitted into the living body tissue 12 (or a water bath having a standard reflector therein). The reflected wave from living body tissue target 4 or a standard reflector is received by transducer 3 and amplified by receiver circuit 5. The amplified signal $V_R$, as illustrated in FIG. 3(B), is transmitted to data collector 6. Timing controller 1 transmits a timing gate pulse $P_G$, as illustrated in FIG. 3(C), to the data collector 6 at a timing $T_1$ after the timing clock pulse $P_D$. Timing $T_1$ corresponds to a round-trip distance from the transducer surface to the tissue portion of interest and back to the transducer. The width $\tau$ of the gate pulse $P_G$ is determined in accordance with the thickness of the tissue to be measured. The gate pulse signal $P_G$ allows the waveform data, as illustrated in FIG. 3(D), to be stored in the data collector 6.

Figure 4A:
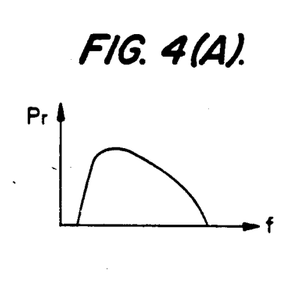
FIGS. 4(A)–4(C) are power frequency spectra of a reflected ultrasonic pulse in various stages of processing.
Figure 4B:
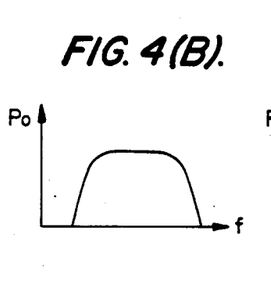

The collected data is transferred to the frequency analyzer 7 wherein the Fast Fourier Transform is performed, and the resulting data is transferred to data memory 8. As a result of the Fast Fourier Transform frequency analysis, a reflected wave power spectrum, as illustrated in FIG. 4(A), or a reflected spectrum from a standard reflector, as illustrated in FIG. 4(B), is obtained.

Figure 4C:
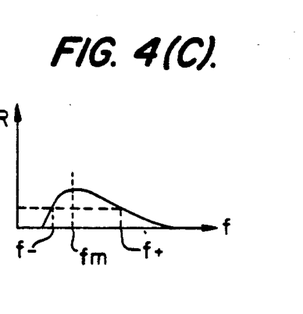

An arithmetic operation processor 9 performs the operations necessary to normalize the frequency spectrum and to obtain n. That is, the power spectrum $P_R$ illustrated in FIG. 4(A), is normalized using the power spectrum $P_0$, illustrated in FIG. 4(B), and the normalized power spectrum R, as illustrated in FIG. 4(C), is obtained as the power transfer function of the living body tissue. The frequency $f_m$ at which the maximum value of the power spectrum occurs is obtained and the $-3$ dB (one half power point) frequencies $f_-$ and $f_+$ are obtained by scanning the power spectrum data for the maximum value and then scanning the power spectrum data for the half power values. From the upper and lower half power frequencies $f_+$ and $f_-$, the upper and lower frequency ratios $y_+ = f_+/f_m$ and $y_- = f_-/f_m$ are calculated. Then a value of n is obtained from $y_+ \exp(1-y_+) = 2^{-1/n}$ or $y_- \exp(1-y_-) = 2^{-1/n}$ or from $n = -1/(\log_2 y_\pm + (1-y_\pm)\log_2 e)$. Arithmetic operation processor 9 can be any general purpose processor as long as it can perform the above calculations. For example, a microcomputer comprising a CPU, RAM, ROM and an I/O port can be used as the arithmetic processor 9 and data memory 8.

Figure 7:
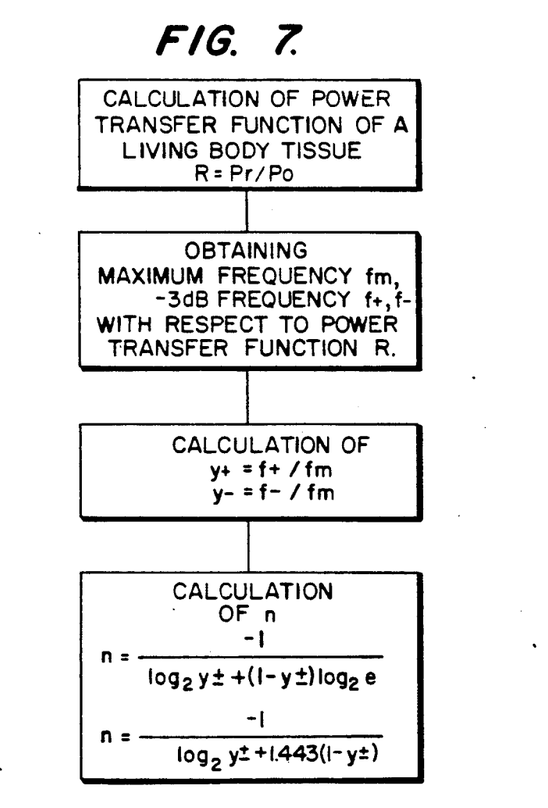
FIG. 7 is a flow chart for the method of the present invention using an n calculation procedure.

FIG. 7 is a flow chart illustrating the calculation method of the present invention used to obtain n. First the normalized power spectrum R is obtained using the received data tissue spectrum $P_R$ and the standard reflector or reference spectrum $P_0$. Next the maximum frequency $f_m$ and half power frequencies $f_+$ and $f_-$ are obtained by scanning the normalized data. Then the upper and lower frequency ratios $y_+$ and $y_-$ are obtained and these values are used to calculate n.

Measurement of the maximum value frequency point $f_m$ and the high and low half power frequencies $f_+$ and $f_-$ are necessary to obtain the upper and lower frequency ratios $y_+$ and $y_-$ of equation 9. R(f) of equation 1 describes a curve having an almost flat peak response which can cause error in determining $f_m$; however, because the high and low half power frequencies $f_+$ and $f_-$ can be determined from parts of the spectrum curve having a large gradient, their measurements can be made with very small error. The n calculation method and the high and low half power frequencies $f_+$ and $f_-$ can be influenced adversely by the previously mentioned scalloping error. The accuracy of the determination of n can be improved by a comparison of the actually measured and normalized frequency ratio values with a table of values for the high and low frequency ratios or of the difference between the high and low frequency ratios $y_+ - y_-$. This improvement occurs because the relative error for the bandwidth, or $y_+ - y_-$, is small even when $y_+$ and $y_-$ include a small amount of error.

Figure 5:
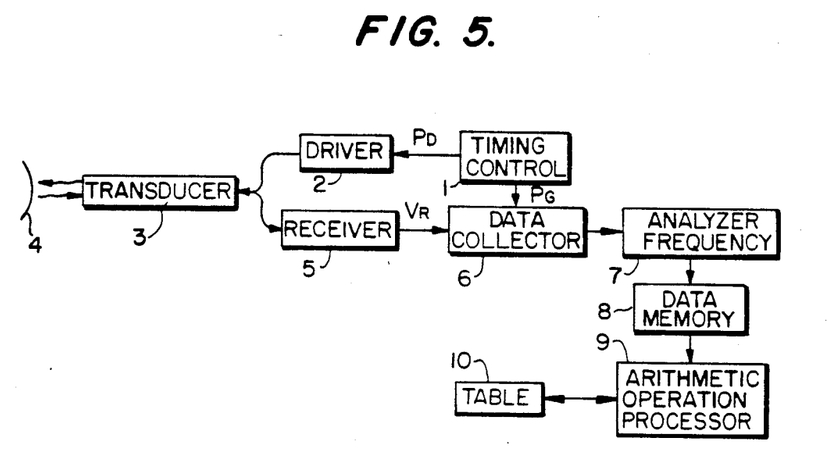
FIG. 5 is a block diagram of an alternate system for performing the method of the present invention.
Figure 6A:
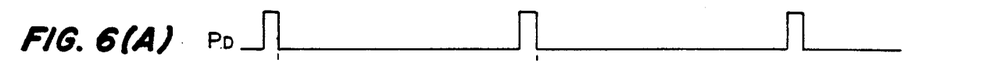
FIGS. 6(A)–6(D) are graphs of signal waveforms in the system of FIG. 5.
Figure 6B:
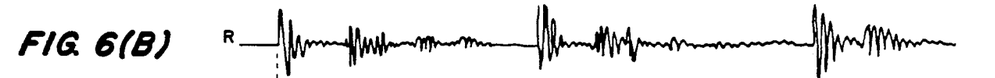
Figure 6C:
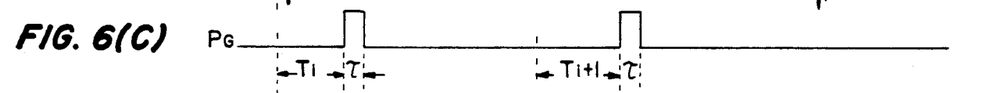
Figure 6D:
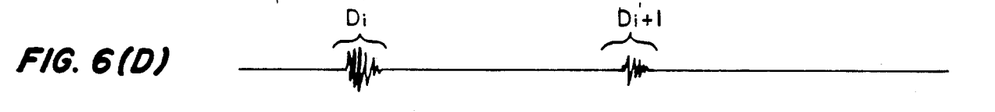

FIG. 5 is a block diagram of an alternate system for performing the method of the present invention in which a table 1 is connected to arithmetic operation processor 9. The arithmetic operation processor 9 calculates $y_+ - y_-$ after executing the necessary operations which are similar to those in the device illustrated in FIG. 2. Table 1 has stored therein a correspondence table of the $y_+ - y_-$ and n values as tabulated in Table 1 below. The value for n can be obtained by referring to this table without executing the necessary calculations for obtaining the log of the frequency ratios, which is required in the device illustrated in FIG. 2. Table 1 can also be located in arithmetic operation processor 9 as part of its internal memory.

TABLE I

| $2^{-1/n}$ | $y_+$ | $y_-$ | $y_+ - y_-$ |
| --- | --- | --- | --- |
| .500 | 2.7 | .24 | 2.46 |
| .707 | 2.1 | .38 | 1.72 |
| .794 | 1.8 | .47 | 1.33 |
| .841 | 1.7 | .51 | 1.19 |
| .871 | 1.6 | .53 | 1.07 |
| .891 | 1.5 | .61 | .89 |

Figure 8:
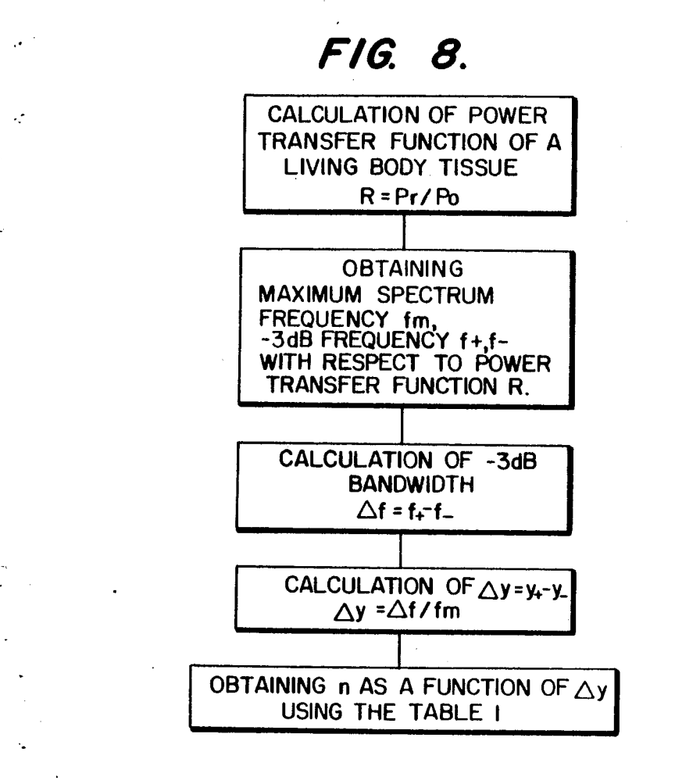
FIG. 8 is another flow chart of the method of the present invention using an n table look-up procedure.

FIG. 8 is a flow chart illustrating the table look-up method of the present invention used to obtain n. The steps for obtaining the half power frequencies $f_+$ and $f_-$ and the maximum power frequency $f_m$ are the same as those illustrated in FIG. 7. After the half power frequencies are determined the half power bandwidth $\Delta f$ is obtained, then the difference in the frequency ratios $\Delta y = \Delta f / f_m$ is obtained. The difference in frequency ratios $\Delta y = y_+ - y_-$ is used as an index into Table 1 to obtain n. This table look-up method provides the advantage of faster and more accurate determination of n as compared to the calculation method of FIG. 7.

A rearrangement of equation 2 results in equation 10:

$$n(z)/4f_{m(z)} = \sum_{i=1}^{z} \beta_i l_i \tag{10}$$

The left side of equation 10 contains $f_{m(z)}$ and n(z) which are obtained from the wave reflected from the depth z and can be obtained by actual measurement and calculation as explained above. The right side is the linear integration of the attenuation slope and can be expressed as equation 11 when the attenuation of the tissue region changes gradually.

$$n(z)/4f_{m(z)} = \int_0^z \beta(z)dz \tag{11}$$

In equation 10, the value of $\beta_i l_i$ in the region i can be obtained from the difference in the values at the region i and the region i+1. A value for $l_i$ can be obtained from a time difference $\Delta T$ for the echo from the boundary of i−1 and i and from the boundary of i and i+1, while a value for $\beta_i$ can also be obtained as shown in equation 12.

$$l_i = \frac{1}{2} \cdot C \cdot \Delta T \tag{12}$$

$$\beta_i = [(n/4f_m)_{i+1} - (n/4f_m)_i] \frac{2}{C\Delta T}$$

As set forth in equation 11 $\beta(z)$ can be obtained by differentiating it with respect to z and equation 13 results.

$$\beta(z) = \frac{c}{\partial z}(n(z)/4f_{m(z)}) = \frac{c}{C\partial t}(n(z)/4f_{m(z)}) \tag{13}$$

As shown in equation 10 or 11, the linear integration of the attenuation slope is obtained along the path length. If the linear integration for various paths are obtained, it is clear that an image reconstruction algorithm well known in X-ray CT (Computer Tomography) can be applied to reconstruct a $\beta$ image instead of using equations 12 or 13.

The system necessary to realize the value of $\beta$ is illustrated in both FIGS. 2 and 5. The operation of the FIG. 5 system is slightly different wherein timing controller 1 generates the time gate pulse $P_G$ as illustrated in FIG. 6 after the time period $T_i$ corresponding to the reflection at the region i based on the timing clock pulse $P_D$, and collects the data $D_i$ during this period of the reflection signals. This data collection is usually repeated several times to obtain an average data signal, thereby eliminating the effect of spectrum scalloping. Next the timing of the gate pulse is shifted to $T_{i+1}$ after $P_D$ and the data $D_{i+1}$ for the i+1 region is collected (over an average period of time). The spectrums of $D_i$ and $D_{i+1}$ are obtained and the respective calculations using equation 12 are carried out by the arithmetic operation processor 9 using the values $n_i$, $n_{i+1}$, $fm_i$ and $fm_{i+1}$ obtained by the calculation method or the table look-up method previously described. In this manner a value of $\beta_i$ can be obtained.

Figure 9:
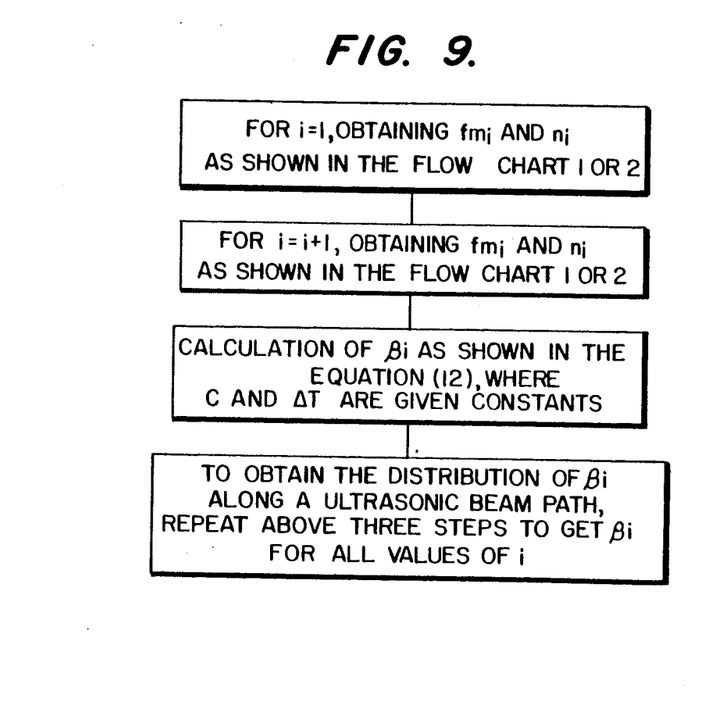
FIG. 9 is a flow chart for the method of the present invention for determining $\beta$.

FIG. 9 illustrates how $\beta$ is obtained using n determined as in FIG. 7 or 8. As illustrated multiple values of the maximum power frequency $f_m$ and n are obtained. These values are used in equation 12 to calculate $\beta_i$. The values $\beta_i$ are determined along the ultrasonic beam path and used, along with other beam path determinations, to generate a tomographic image.

From the above explanation, n(z) and β(z) can be obtained at every depth z in the direction z along the ultrasonic wave beam or scanning line. Thus, it is possible to obtain the distribution of n and β on a tomographic plane and display the values for n and β by successively shifting the scanning line in the scan plane.

It is also possible to reconstruct the distribution of β(z), that is, construct a tomographic image, by a well known algorithm such as an X-ray computer tomography algorithm when the linear integrations, set forth in equation 10 or equation 11, for all directions are obtained.

The above-mentioned living body tissue characteristic parameters are very effective for detecting diseased portions of the human body such as cancer or to observe the progress of such a disease. This method of tissue analysis is a non-invasive measurement method that can be realized by contacting the ultrasonic probe against only the surface of the human body.

A reflected ultrasonic wave also has a reflection intensity value or coefficient. The reflection intensity coefficients for ultrasonic waves beamed from different tissue points can be combined to create a reflection intensity tomographic image using the well known tomographic imaging processing programs.

More precise and reliable diagnostic information can be obtained by combining the image of the method of the present invention with the image from methods such as the ultrasonic reflection intensity X-ray, X-ray CT, NMR and Radiosotope imaging methods and displaying the two of the tomographic images on a superimposed basis. It should be recognized by those of skill in the art that the use of the half power point (−3dB) as the point for determining the upper and lower frequencies of the power spectrum is an arbitrary selection made because it is a well recognized engineering breakpoint, and other arbitrarily selected power spectrum values can be selected as the upper and lower frequency points.

The many features and advantages of the invention are apparent from the detailed specification, and thus it is intended by the appended claims to cover all such features and advantages of the method which fall within the spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope of the invention.

What we claim is:

1. An ultrasonic living body tissue characterization method, comprising the steps of:
    (a) transmitting an ultrasonic pulse into the body tissue, receiving an echo reflected from within the body tissue and producing an echo signal from the echo;
    (b) converting a portion of the echo signal corresponding to a depth z into a power spectrum;
    (c) deriving a tissue power transfer function, R(f), of the portion utilizing a reference power spectrum obtained at the depth z in a reference medium where f indicates frequency within the spectrum;
    (d) finding a maximum, Rm, of the tissue power transfer function R(f) and a frequency, fm, at which the maximum Rm occurs;
    (e) normalizing the tissue power transfer function R(f) with the maximum Rm;
    (f) producing a normalized frequency y in accordance with $y = f/fm$ and substituting the normalized frequency, y, for the frequency f; and
    (g) extracting a reflection power exponent, n, from the shape of the normalized tissue power transfer function R(f)/Rm as a function of the normalized frequency y and the reflection power exponent n.

2. A method as recited in claim 1, further comprising the step of (h) producing an attenuation slope β using the reflection power exponent n.

3. A method as recited in claim 2, wherein step (g) comprises the steps of:
    (g1) determining a high fraction frequency f+ higher than fm at which the value of the normalized tissue power transfer function is a fraction of the maximum Rm;
    (g2) producing a low fraction frequency f− lower than fm at which the value of the normalized tissue power transfer function is the fraction of the maximum Rm;
    (g3) calculating an upper frequency ratio y+ dependent on fm and f+;
    (g4) computing a lower frequency ratio y− dependent on fm and f−; and
    (g5) determining the reflection power exponent n in dependence on y+ and y−.

4. A method as recited in claim 3, wherein step (g5) performs $$n = -1/(\log_2 y\pm + (1-y\pm)\log_2 e).$$

5. A method as recited in claim 4, wherein $y+ = f+/fm$ and $y- = f-/fm$.

6. A method as recited in claim 5, wherein the tissue being characterized has tissue regions numbered 1 to i, wherein i is a positive integer, and further comprising the step of (i) calculating at least one of an attenuation slope $\beta i$ and $\beta(z)$ for each tissue region from one of $$\beta i = ((n/4fm)_{i+1} - (n/4fm_i)) \frac{2}{C\Delta T} \text{ or}$$

$$\beta(z) = \frac{\partial}{\partial z}\left(\frac{n}{4fm}\right) = \frac{2}{C\partial t}\left(\frac{n}{4fm}\right)$$

where ΔT is the time difference between the echos from the boundaries i+1, i and i, i−1, and C is the velocity of sound in the living body tissue.

7. A method as recited in claim 6, wherein the fraction is equal to one-half.

8. A method as recited in claim 7, further comprising the steps of:
    (j) calculating a linear integration of β along a path from n; and
    (k) producing one of a β and n image using a computer tomography image reconstruction algorithm on the linear integrations for various projections.

9. A method as recited in claim 7, wherein pulses are transmitted into the body tissue and reflected echos received a plurality of times from different locations of the living body, and said method further comprises the step of (l) generating at least one of an attenuation slope βi and a reflection power exponent ni tomographic image representing one of an attenuation slope and reflection power exponent diagnostic image used for living body tissue diagnosis.

10. A method as recited in claim 9, wherein each reflected echo has a reflection intensity, and wherein said method further comprises the steps of:
  (m) generating a reflection intensity tomographic image in dependence upon the reflection intensity of the reflected echo; and
  (n) combining the reflection intensity tomographic image with at least one of the attenuation slope $\beta i$ and the reflection power exponent ni tomographic image.

11. A method as recited in claim 10, wherein step (b) performs a Fast Fourier transform on the reflected echo.

12. A method as recited in claim 11, wherein step (c) comprises the steps of:
  (c1) generating the reference power spectrum; and
  (c2) dividing the power spectrum by the reference power spectrum and subtracting a log spectra therefrom.

13. A method as recited in claim 3, using a table for storing values of n for each value of $y+ - y-$, and wherein step (g5) comprises:
  (g5i) scanning said table with the value of $y+ - y-$; and
  (g5ii) comparing the value with table entries until a match is found, the value of n is the corresponding table entry when a match occurs.

14. A method as recited in claim 13, wherein $y+ = f+/fm$ and $y- = f-/fm$.

15. A method as recited in claim 14, wherein the tissue being characterized has tissue regions numbered 1 to i, where i is a positive integer, and further comprising the step of (i) calculating at least one of an attenuation slope $\beta i$ and $\beta(z)$ for each tissue region from $$\beta i = ((n/4fm)_{i-1} - (n/4fm_i)) \frac{2}{C\Delta T} \text{ or}$$

$$\beta(z) = \frac{c}{\partial z}\left(\frac{n}{4fm}\right) = \frac{c}{C\partial t}\left(\frac{n}{4fm}\right)$$

wherein $\Delta T$ is the time difference between the echoes from the boundaries $i+1$, i and i, $i-1$, and C is the velocity of sound in the living body tissue.

16. A method as recited in claim 15, wherein the fraction is equal to one-half.

17. A method as recited in claim 16, further comprising:
  (j) calculating a linear integration of $\beta$ along a path from n; and
  (k) constructing one of a $\beta$ and n image using a computer tomography image reconstruction algorithm on the linear integrations for various projections.

18. A method as recited in claim 16, wherein pulses are transmitted into the body tissue and reflected echos received a plurality of times from different locations of the living body, and further comprising the step of (j) generating at least one of an attenuation slope $\beta i$ and reflection power exponent ni tomographic image representing one of an attenuation slope and reflection power exponent diagnostic image used for living body tissue diagnosis.

19. A method as recited in claim 18, wherein each reflected echo has a reflection intensity, and further comprising the steps of:
  (k) generating a reflection intensity tomographic image in dependence upon the reflection intensity of the reflected echo; and
  (l) combining the reflection intensity tomographic image with one of the attenuation slope $\beta i$ and the reflection power exponent ni tomographic image.

20. A method as recited in claim 19, wherein step (b) performs a Fast Fourier Transform on the reflected echo.

21. A method as recited in claim 20, wherein step (c) comprises the steps of:
  (c1) generating the reference power spectrum; and
  (c2) dividing the power spectrum by the reference power spectrum and subtracting a log spectra.

* * * * *

UNITED STATES PATENT AND TRADEMARK OFFICE
CERTIFICATE OF CORRECTION

PATENT NO. : 4,575,799

DATED : March 11, 1986

INVENTOR(S) : HIROHIDE MIWA ET AL.

It is certified that error appears in the above-identified patent and that said Letters Patent is hereby corrected as shown below:

Col. 1, line 41, "reflected" should be --reflection--;

line 43, "reflected" should be --reflection--.

Col. 3, line 24, "bove" should be --above--.

Col. 4, line 23 [line numbering off],

"systtem" should be --system--.

Col. 5, line 59, "$f_{30}$" should be --$f_{+}$--.

Col. 8, line 15, --$f$-- should be inserted in formula (11) as indicated.

Signed and Sealed this

First Day of July 1986

[SEAL]

Attest:

DONALD J. QUIGG

Attesting Officer

Commissioner of Patents and Trademarks